United States Patent [19]

Gajjar

[11] Patent Number: 5,787,463
[45] Date of Patent: Jul. 28, 1998

[54] DISK ARRAY SYSTEM INCLUDING A DUAL-PORTED STAGING MEMORY AND CONCURRENT REDUNDANCY CALCULATION CAPABILITY

[75] Inventor: Kumar Gajjar, San Jose, Calif.

[73] Assignee: MTI Technology Corporation, Sunnyvale, Calif.

[21] Appl. No.: 834,349

[22] Filed: Apr. 15, 1997

Related U.S. Application Data

[63] Continuation of Ser. No. 445,622, May 22, 1995, abandoned.

[51] Int. Cl.$^6$ ............................. G06F 13/16; G06F 11/10
[52] U.S. Cl. ........................ 711/114; 711/149; 711/169; 395/182.04
[58] Field of Search .................. 395/441, 182.03, 395/182.04, 476, 496; 711/114, 149, 169

[56] References Cited

U.S. PATENT DOCUMENTS

| | | | |
|---|---|---|---|
| 4,870,643 | 9/1989 | Bultman et al. | 395/182.05 |
| 5,042,014 | 8/1991 | Pinkham et al. | 365/230.05 |
| 5,124,987 | 6/1992 | Milligan et al. | 395/182.05 |
| 5,134,619 | 7/1992 | Henson et al. | 371/40.15 |
| 5,140,592 | 8/1992 | Idleman | 395/182.03 |
| 5,146,574 | 9/1992 | Gajjar et al. | 711/114 |
| 5,166,939 | 11/1992 | Jaffe et al. | 371/40.4 |
| 5,185,876 | 2/1993 | Nguyen et al. | 395/841 |
| 5,202,856 | 4/1993 | Glider et al. | 365/230.05 |
| 5,226,010 | 7/1993 | Glider et al. | 365/189.04 |
| 5,233,618 | 8/1993 | Glider et al. | 395/182.04 |
| 5,233,692 | 8/1993 | Gajjar et al. | 395/309 |
| 5,274,645 | 12/1993 | Idleman et al. | 375/182.04 |
| 5,285,451 | 2/1994 | Henson et al. | 395/182.04 |
| 5,325,497 | 6/1994 | Jaffe et al. | 711/114 |
| 5,349,686 | 9/1994 | Gajjar et al. | 395/670 |
| 5,373,512 | 12/1994 | Brady | 371/40.1 |
| 5,386,548 | 1/1995 | Nguyen et al. | 395/872 |
| 5,471,640 | 11/1995 | McBride | 395/842 |
| 5,490,263 | 2/1996 | Hashemi | 711/149 |
| 5,586,299 | 12/1996 | Wakerly | 395/476 |
| 5,634,033 | 5/1997 | Stewart et al. | 395/441 |

FOREIGN PATENT DOCUMENTS

| | | |
|---|---|---|
| 0 156 724 | 10/1985 | European Pat. Off. . |
| 0 201 330 | 11/1986 | European Pat. Off. . |
| 0 266 789 | 5/1988 | European Pat. Off. . |
| 0 320 107 | 6/1989 | European Pat. Off. . |

OTHER PUBLICATIONS

Dekoning et al., Intelligent interface for disc array supporting RAID levels has PCI bus from host to interface and independent dual port memory accessed by discs and parity assist engine, DERWENT WPI, Abstract, Dec. 16, 1994.

Muntz et al. (1990) "Performance Analysis of Disk Arrays Under Failure" UCLA Computer Science Department.

Seagate Product Catalog "Arrayed Disc Subsystem," Array Products Group, Boulder, CO ©1988.

*Primary Examiner*—Eddie P. Chan
*Assistant Examiner*—Reginald G. Bragdon
*Attorney, Agent, or Firm*—Townsend and Townsend and Crew LLP

[57] ABSTRACT

The present invention is directed to memory subsystems that use redundant arrays of inexpensive disks (RAID). The subsystem enables dual concurrent accesses to the subsystem buffer by the host and RAID engine, which calculates parity information associated with data being transferred between the host and disk drives, by including a dual-ported staging memory where the host and disk drives are coupled to one port and the RAID engine to the other port. Positioning the RAID engine on the opposite side of the staging memory in relation to the host and disk drives allows for pipelined asynchronous memory subsystem operation, improving system throughput.

12 Claims, 4 Drawing Sheets

DISK ARRAY SYSTEM INCLUDING A DUAL-PORTED STAGING MEMORY AND CONCURRENT REDUNDANCY CALCULATION CAPABILITY

This is a Continuation of application Ser. No. 08/445,622, filed May 22, 1995, now abandoned, the disclosure of which is incorporated by reference.

BACKGROUND OF THE INVENTION

The present invention relates generally to memory subsystems that use redundant arrays of independent disks (RAID). More particularly, the invention is directed to a method and apparatus for optimizing the use of a staging memory between a host, disk drives and the RAID engine.

Computer systems that include a RAID memory subsystem use one or more arrays of independent magnetic disk drives for system storage. By using an array of smaller disks, rather than a few larger disks, the rate of data transfers between host and disk drives is improved, since the data transfers are distributed among a number of smaller disk drives, rather than being concentrated in one or only a few large drives. Since an array of disk drives is used for storage, reliability becomes an issue as the failure rates of each drive unit individually contribute to lower overall array reliability. One way to handle the issue is to use extra disks in the array as storage for parity and error recovery information so that the original data may be recovered in the event of a failure. The parity information is calculated in the memory subsystem by software or a "RAID engine," which can be made up of several different elements, including a microprocessor and dedicated logic. There are six main RAID system configurations, RAID 0 through RAID 5. Each of these differs in the way data and associated parity information are stored in the disk array. RAID systems are described in detail in U.S. Pat. No. 5,140,592 and U.S. Pat. No. 5,233,618, both of which are assigned to the assignee of the present invention and are incorporated by reference herein.

Current RAID systems operate in an entirely synchronous fashion, since they use a subsystem staging buffer with only one port through which the memory can communicate with the host, disk drives and RAID engine. The staging memory serves as the temporary storage area for data being transferred between the host and storage array while the RAID engine calculates parity information. The host loads data to be stored in the disk drives into the staging memory. The RAID engine then retrieves this data and generates the parity information. The new parity is then loaded back into the staging memory, and the new data and corresponding parity are subsequently stored in the appropriate disk drives. The current RAID systems permit only one access to the staging memory at a time. Thus, after the host loads data in the staging memory, the RAID engine retrieves that data, calculates its parity and then writes the new parity back to the staging memory, from where the new data and parity are eventually stored in the disk drives. The single access system using the single-ported staging memory is inefficient if the other data is available to be moved into the staging memory before the RAID engine has completed the parity calculations. Accordingly, it would be desirable to have a RAID system that makes more efficient use of the bus to improve data throughput.

SUMMARY OF THE INVENTION

The present invention optimizes RAID system performance by allowing both the host and RAID engine to concurrently access the subsystem staging buffer. A dual-ported memory device is used as the staging buffer, and the host and disk drives are coupled to one I/O port, while the RAID engine is coupled to the other I/O port. Positioning the RAID engine on the opposite side of the staging memory in relation to the host and disk drives allows for pipelined asynchronous memory subsystem operation, improving system throughput. After the host has loaded a data block into the first port of the staging memory, the RAID engine reads the data from the second port and begins performing parity calculations. In the meantime, the first port of the staging memory is available to receive the next data block from the host. There is no need for the host to wait until the RAID engine has calculated and stored the parity for the first data block before loading the next data block into the staging memory. The invention will be better understood by reference to the following detailed description in connection with the accompanying drawings.

DESCRIPTION OF THE PREFERRED EMBODIMENTS

Figure 1:
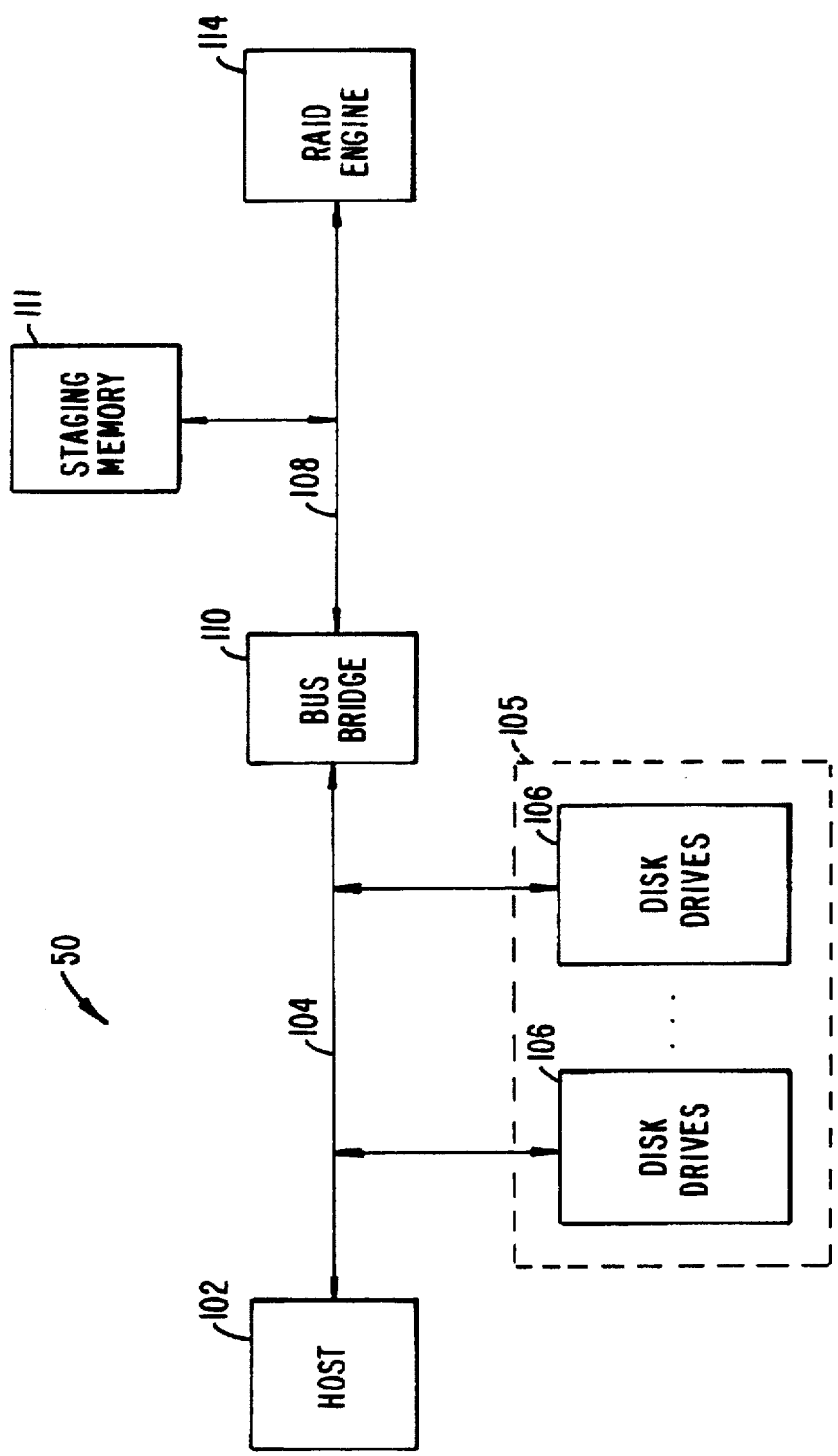
FIG. 1 shows a block diagram of a prior art RAID system having a single-ported staging memory.

FIG. 1 shows a block diagram of a prior art RAID system 50 having a single-ported staging memory. Host processor is coupled to the system by disk bus 104. Attached to disk bus 104 is disk array 105 that houses disk drives 106, which serve as the storage elements in the RAID system 50. The disk bus 104 is connected to a memory bus 108 by a bus bridge 110. The memory bus 108 couples single-ported staging memory 111 to RAID engine 114.

As discussed above, host 102 loads data to be stored in the disk drives 106 into staging memory 111. The RAID engine 114 then retrieves this data and generates the parity information associated with the data block. The newly-calculated parity is then loaded back into the staging memory 111 and subsequently stored in the appropriate disk drives 106. RAID system 50 permits only one access to staging memory 111 at a time. Thus, after host 102 loads data into staging memory 111 on disk bus 104, RAID engine 114 retrieves that data on memory bus 108, calculates its parity and then writes the parity back to the staging memory 111, from where the data and parity are eventually stored in the disk drives 106. The single access system using the single-ported staging memory is inefficient if the other data is available to be moved into the staging memory before the RAID engine has completed the parity calculations, since the RAID engine 114 and host 102 will compete for access to the memory bus 108 and staging memory 111. Accordingly, the present invention is directed to a RAID system that improves data throughput.

Figure 2:
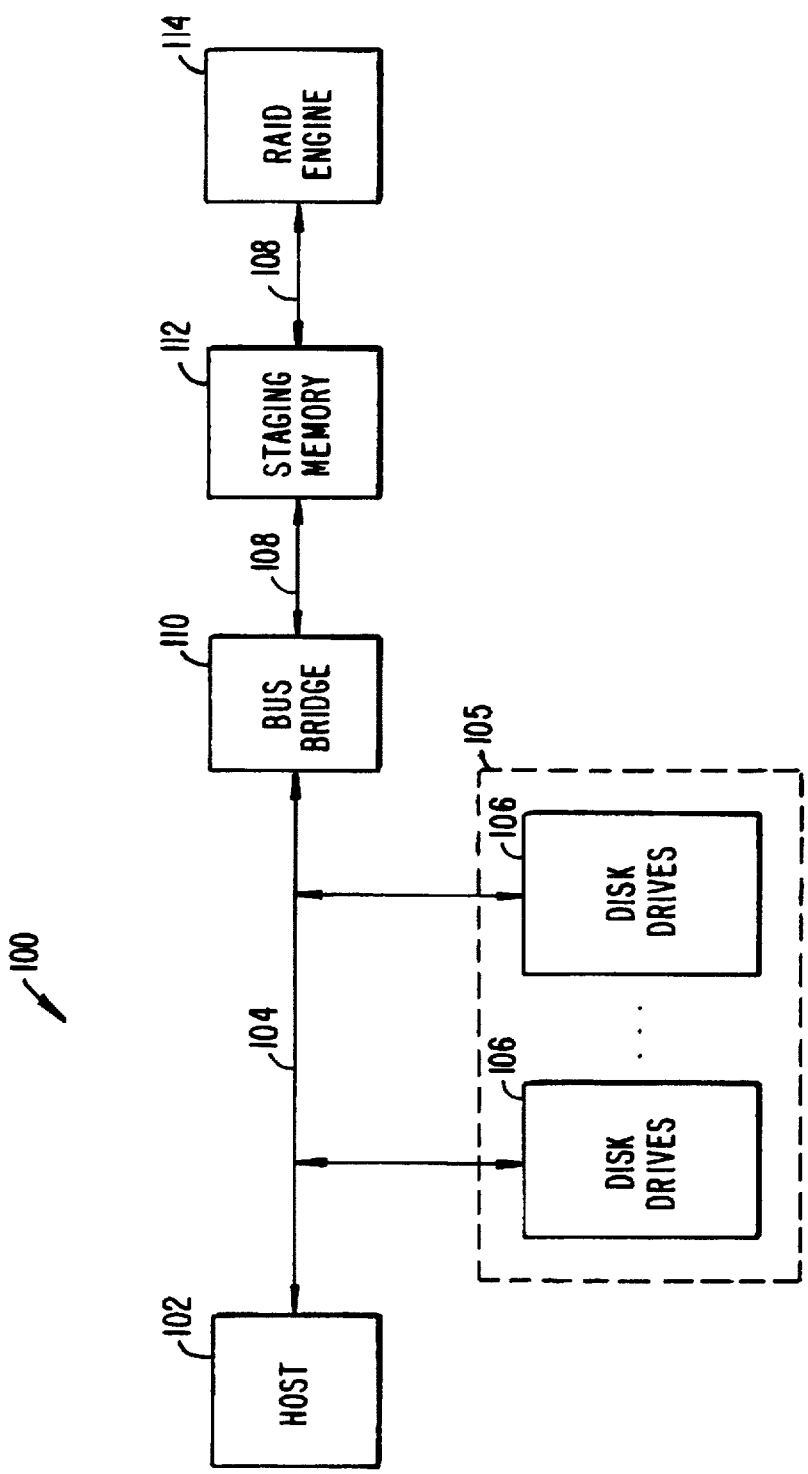
FIG. 2 shows a block diagram of an embodiment of the RAID system of the present invention allowing for dual concurrent accesses by the host and RAID engine by using a dual-ported staging memory.

FIG. 2 shows a block diagram of the preferred embodiment of RAID system 100 of the present invention. Host processor 102 is coupled to the system via a disk bus 104. Disk bus 104 could be, for example, a SCSI Personality Module (SPM) bus. Attached to disk bus 104 is disk array 105 that houses disk drives 106, which serve as the storage elements in the RAID system 100. The disk bus 104 is connected to a memory bus 108 by a bus bridge 110. Memory bus 108 could be, as an example, an Intelligent Memory Module (IMM) bus. The memory bus 108 couples dual-ported staging memory 112 to RAID engine 114. Staging memory 112 may be either static or dynamic RAM, as long as it is dual-ported or a VRAM (video RAM), for example.

If disk bus 104 and memory bus 108 were of the same type, the bus bridge 110 shown in FIG. 1 would not be necessary. So, if an SPM bus 104 were used to interconnect the host 102, disk drives 106, staging memory 112 and RAID engine 114, the circuit would be simplified by eliminating the bus bridge.

In a Read-Modify-Write operation in a RAID-5 system, when the host 102 writes new data to the disk array 105, old data already stored on disk drives 106 is subtracted from old parity information, and the new data is added to the old parity to generate new parity. Thus, in a RAID-5 system, where parity information is striped across each disk drive in the array, every sector of data written from host 102 to disk array 105 requires five transactions on the disk bus 104 and four transactions on the memory bus 108. The host 102 moves the new data into the staging memory 112, old data is transferred from disk drives 106 to staging memory 112 and old parity is moved from the parity drive in the array 105 into staging memory 112, which accounts for three transactions on the disk bus 104. The RAID engine 114 separately reads the new data, old data and old parity from staging memory 112 and generates new parity that is written back to staging memory 112, which make up the four transactions on memory bus 108. Finally, in the final two transactions on disk bus 104, the new data and new parity information are stored from staging memory 112 to the disk drives 106 in the drive array 105. In current RAID systems, the host can initiate another operation with the staging memory before all of the above transactions have been completed, but because the host and RAID engine are competing for access to the same memory bus, the concurrent operations are not handled as quickly or efficiently as would be desired.

The present invention allows pipelining of these transactions to improve system throughput. For example, after new data, old data and old parity information are loaded into staging memory 112 and these buffers have been read by the RAID engine 114, the host could initiate another operation by loading new data to be stored in other disk drives 106 in the disk array while the RAID engine 114 is busy calculating the new parity for the previous data. Pipelining of transactions is possible because memory bus 108, on one side of dual-ported staging memory 112, can handle the bus traffic associated with parity calculation performed by RAID engine 114, freeing the disk bus 104 on the other side of memory 112 to handle the loading (writing) or off-loading (reading) of data for the next operation involving staging memory 112.

A RAID-3 system containing one parity drive for each four data drives requires nine operations on disk bus 104 and five operations on memory bus 108 for each four sectors written to disk array 105. The host 102 first performs four write operations by loading each of the four sectors into staging memory 112. Then, RAID engine 114 reads the four sectors from staging memory 112 and generates parity that is written back to staging memory 112. Finally, each of the four sectors is stored on four data drives and the associated parity information is stored on a parity drive in the disk array 105.

Again, the present invention allows pipelining of these transactions to improve system throughput. For example, if the host 102 initially loads only the first two of the four sectors into staging memory 112, the RAID engine 114 can retrieve those two sectors and begin calculating their parity information. Then, after the host 102 has loaded the remaining two sectors into staging memory 112, RAID engine 114 can retrieve the final two sectors for this write operation and complete the parity calculations for all four sectors. Because RAID engine 114 is coupled to one port of dual-ported memory 112, it can begin the parity calculations and at the same time leave disk bus 104 free for loading the remaining two sectors into the other port of memory 112. Another example of pipelining in the RAID-3 system occurs when the host 102 loads all four sectors to be written on one set of four drives into staging memory 112. RAID engine 114 can then read those four sectors and calculate the associated parity bits. While the RAID engine is busy with that task, the host 102 can load the next four sectors to be written to disk array 105 into staging memory 112, where they will wait until RAID engine 114 is free and can retrieve the new sectors to calculate the related parity information.

Figure 3:
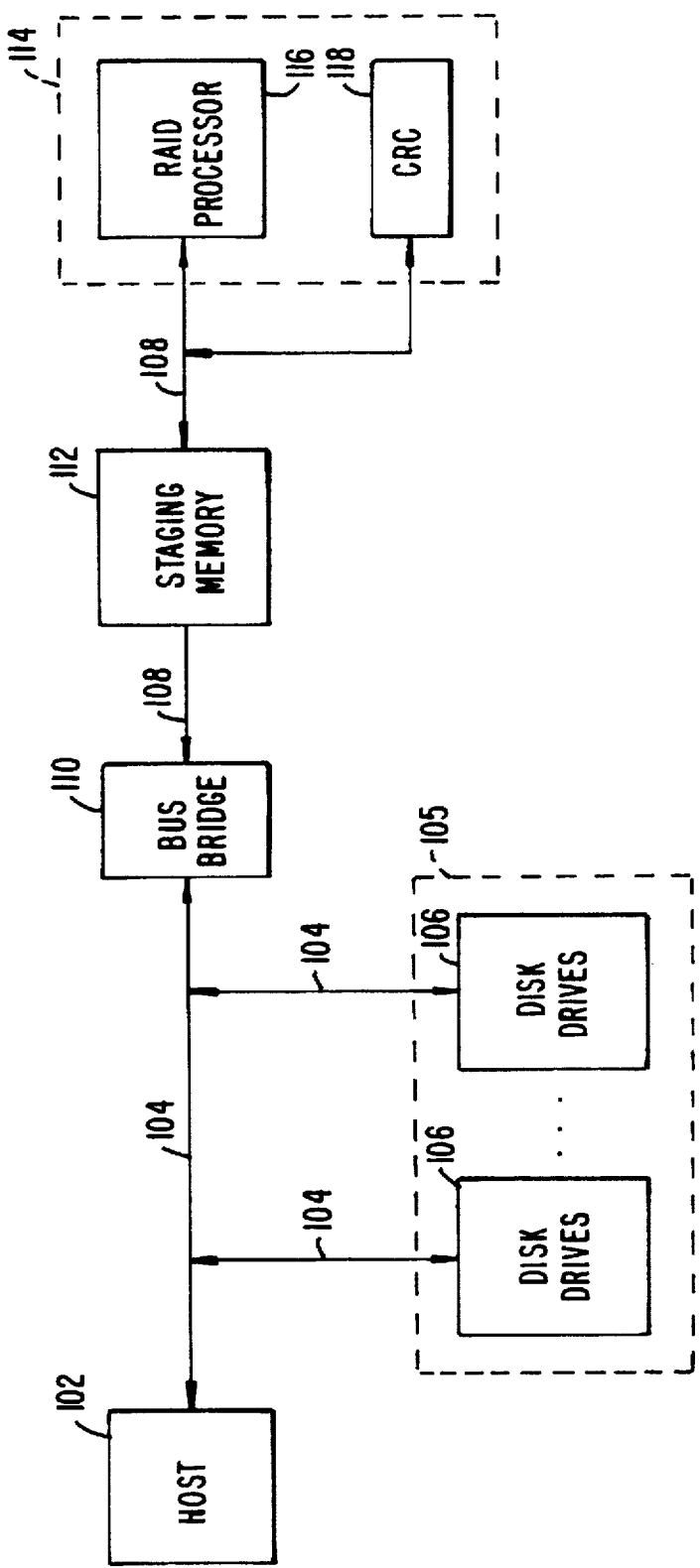
FIG. 3 shows a block diagram of an embodiment of the RAID system of the present invention having one dual-ported staging memory where the RAID engine includes a microprocessor and a CRC block.

RAID engine 114 can be implemented in a number of different ways, as long as it has the capability to retrieve data from staging memory 112 and calculate the parity information. FIG. 3 shows one implementation for RAID engine 114. All elements shown in FIG. 1 are identified by the same numbers. Memory bus 108 extends from the second port of staging memory 112 to RAID engine 114. RAID engine 114 includes a RAID processor 116 and a CRC generator 118, each of which is coupled to memory bus 108. RAID processor 118 controls the calculation and parity generation for data retrieved from the staging memory. CRC generator 116 is dedicated hardware used to calculate the cyclic redundancy check (CRC) associated with the sectors to be stored in disk array 105. The host 102 loads data into staging memory 112 on disk bus 104. RAID processor 116 then retrieves the new data from staging memory 112 for parity calculations. While RAID processor 116 is performing the parity calculations, CRC generator 118 snoops memory bus 108 for data transfers. If a data transfer is detected, CRC generator 118 reads the data and calculates its CRC. After RAID processor 116 has completed parity calculation for an entire data block, the calculated data parity is stored in staging memory 112 with an associated data block. RAID processor 116 then reads a calculated CRC for each data block from CRC generator 118 and generates a CRC parity by performing an exclusive-or (XOR) function on all the calculated CRCs. Finally, RAID processor 116 stores the calcuated CRCs for each data block and the XORed CRC parity back into staging memory 112 with the associated data block via memory bus 108. When disk bus 104 is free, the data blocks and associated parity are stored in storage array 105.

As known to one skilled in the art, RAID processor 116 is able to perform functions other than just calculating parity on a data block. Merely by way of example, RAID processor 116 may also compare two data blocks, copy a block from one location to another, or fill a block of data with a specified data pattern. In all cases, the advantages of implementing a dual-ported staging memory in RAID system 100 described above still pertain.

Figure 4:
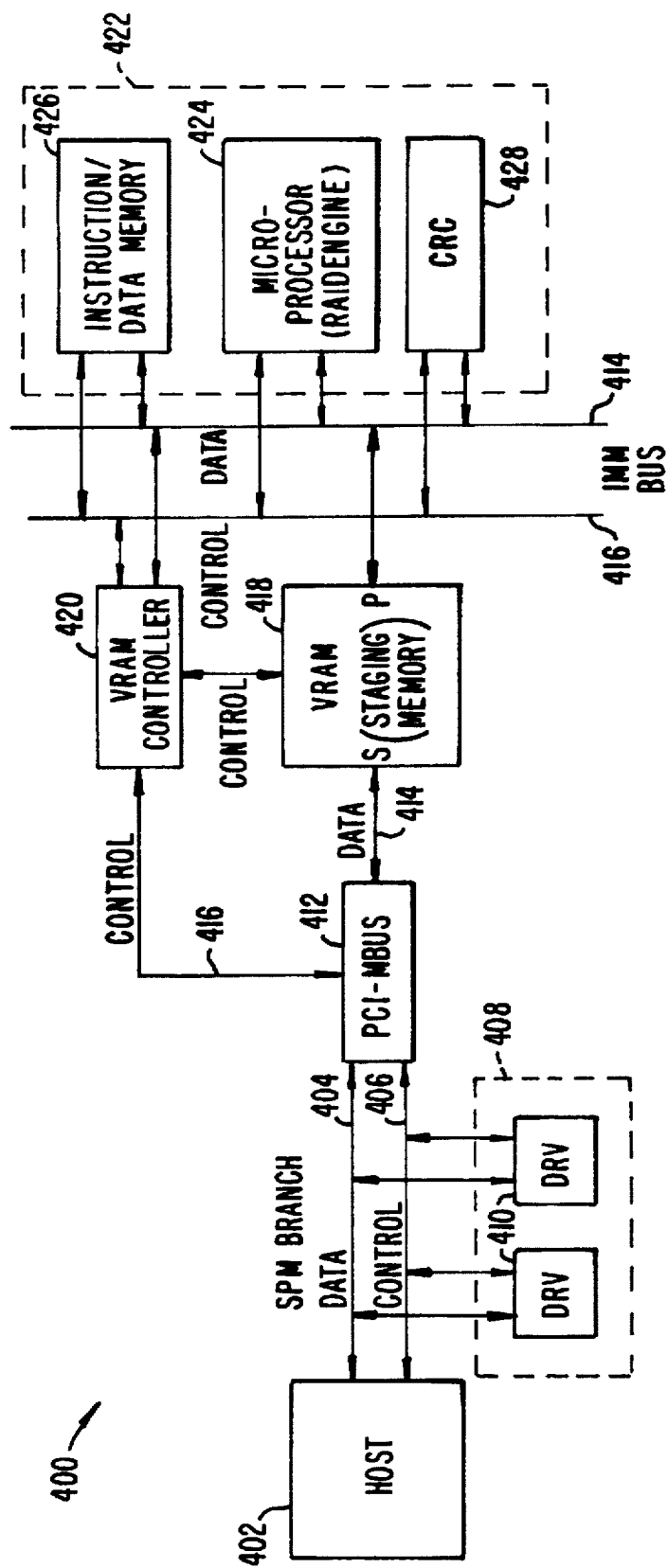
FIG. 4 shows a block diagram of an embodiment of the RAID system of the present invention having a VRAM as a staging memory and a RAID engine including a microprocessor and a CRC block.

FIG. 4 shows a block diagram of a RAID system 400 a VRAM (video RAM) as a staging memory and a RAID engine including a processor and a CRC block. A host processor 402 is coupled to the system via a disk bus, which includes a data bus 404 and a control bus 406. In the embodiment of FIG. 4, disk data bus 404 and disk control bus 406 combine to form a SCSI Personality Module (SPM) bus. It should be understood, of course, that other appropriate disk buses may be used in place of the SPM bus. Attached to disk data bus 404 and disk control bus 406 is disk array 408 that houses disk drives 410, which serve as the storage elements in the RAID system 400. The disk bus 104 is connected to a memory bus by a bus bridge 412, shown in this example as a PCI-Mbus bridge. In the embodiment of FIG. 4, the memory bus includes a memory data bus 414 and memory control bus 416, which combine to form a Intelligent Memory Module (IMM) bus. It should be understood, of course, that other appropriate memory buses may be used in place of the IMM bus. The memory data bus 414 and memory control bus 416 couple bus bridge 410 to a dual-ported staging memory. In the present example, the staging memory is a VRAM (video RAM) device 418 with an associated VRAM controller 420. Memory data bus 414 is coupled to VRAM 418, while memory control bus 416 is coupled to VRAM controller 420.

VRAM 418 is coupled by memory data bus 414 to RAID engine 422, and VRAM controller 420 is coupled by memory control bus 416 to RAID engine 422. RAID engine 422 includes a microprocessor 424, a memory 426 and CRC generator 428. Similar to the above example in FIG. 3, RAID processor 424 controls the calculation and parity generation for data retrieved from the staging memory, which is stored in memory 426 during parity generation. CRC generator 428 is dedicated hardware used to calculate the cyclic redundancy checksum (CRC) associated with the sectors to be stored in disk array 408. Host 402 loads data into VRAM staging memory 418 on disk bus 404. RAID processor 424 then retrieves the new data from staging memory 418 for parity calculations. While RAID processor 424 is performing the parity calculations, CRC generator 428 snoops memory data bus 414 for data transfers. If a data transfer is detected, CRC generator 428 reads the data and calculates its CRC. After RAID processor 424 has completed parity calculation for an entire data block, the calculated data parity is stored in staging memory 418 with an associated data block. RAID processor 424 then reads a calculated CRC for each data block from CRC generator 428 and generates a CRC parity by performing an exclusive-or (XOR) function on all the calculated CRCs. Finally, RAID processor 424 stores the calcuated CRCs for each data block and the XORed CRC parity back into staging memory 418 with the associated data block via memory data bus 414. When disk data bus 404 is free, the data blocks and associated parity are stored in storage array 408.

Again, as known to one skilled in the art, RAID processor 424 is able to perform functions other than just calculating parity on a data block. Merely by way of example, RAID processor 424 may also compare two data blocks, copy a block from one location to another, or fill a block of data with a specified data pattern. In all cases, the advantages of implementing a dual-ported staging memory in RAID system 400 described above still pertain.

The RAID system of FIG. 4 having a dual-ported staging memory offers significant performance advantages over the prior art subsystem shown in FIG. 1, which only has a single-ported staging memory, because use of the dual-ported staging memory permits dual concurrent access to the staging memory by both the host processor and the RAID engine. A measure of the data write transfer rates shows exactly the improvement in performance that comes with the RAID system of the present invention. The data write transfer rate is a measure of how quickly data can be transferred from the host to the disk drives through the staging memory and RAID engine. In the prior art system of FIG. 1, which includes only a single-ported staging memory and a single data bus, a typical data write transfer rate that can be achieved for a RAID-5 transaction is 8 MBytes/sec. However, when a dual-ported staging memory and two data buses are implemented in the RAID system, as in FIG. 4, making dual-concurrent accesses possible, a typical data rate for RAID-5 transactions is 15 MBytes/sec. For RAID-3 transactions, the prior art is bottlenecked at 22 MBytes/sec. But the present invention offers nearly twice the performance, allowing a typical data write transfer rate of 41 MBytes/sec because both the host processor and RAID engine may concurrently access the staging memory.

The invention has now been explained with reference to specific embodiments. Other embodiments will be apparent to those of ordinary skill in the art upon reference to the present description. It is therefore not intended that this invention be limited, except as indicated by the appended claims.

What is claimed is:

1. In a computer system having a host computer, a storage subsystem and a plurality of storage devices, wherein the host computer transfers data blocks to and from the plurality of storage devices through the storage subsystem, the storage subsystem comprising:

a dual-ported memory device for storing the data blocks being transferred between the host computer and the plurality of storage devices, the dual-ported memory device having a first port coupled to the host computer and the plurality of storage devices; and a RAID engine providing pipelined operation of the computer system coupled to a second port of the dual-ported memory device for retrieving a first data block from the dual-ported memory device, calculating parity information associated with the first data block at the same time that a second data block is being transferred to the dual-ported memory device and storing the calculated parity information in the dual-ported memory device.

2. The computer system of claim 1 wherein the RAID engine further comprises a microprocessor for controlling retrieval of data from the dual-ported memory device and calculation of the parity information associated with the retrieved data from the dual-ported memory device.

3. The computer system of claim 2 wherein the RAID engine further comprises a cyclic redundancy checksum (CRC) logic block coupled to the microprocessor for calculating CRC information associated with the retrieved data from the dual-ported memory device.

4. The computer system of claim 1 wherein the dual-ported memory device further comprises a video random access memory (VRAM) device.

5. A computer system comprising:

a host computer;

a system bus coupled to the host computer for transferring data blocks to and from the host computer;

a plurality of storage devices coupled to the system bus for storing the data blocks from the host computer;

a dual-ported memory device for storing the data blocks being transferred between the host computer and the plurality of storage devices, the dual-ported memory device having a first port coupled to the system bus; and a RAID engine providing pipelined operation of the computer system coupled to a second port of the dual-ported memory device for retrieving a first data block from the dual-ported memory device, calculating parity information associated with the first data block at the same time that a second data block is being transferred to the dual-ported memory device and storing the calculated parity information in the dual-ported memory device.

6. The computer system of claim 5 further comprising:

a bus bridge having a first port coupled to the system bus;

a memory bus coupled to a second port of the bus bridge.

7. The computer system of claim 5 wherein the dual-ported memory device further comprises a video random access memory (VRAM) device.

8. The computer system of claim 5 wherein the RAID engine further comprises a microprocessor for controlling retrieval of data from the dual-ported memory device and calculation of the parity information associated with the retrieved data from the dual-ported memory device.

9. The computer system of claim 8 wherein the RAID engine further comprises a cyclic redundancy checksum (CRC) logic block coupled to the microprocessor for calculating CRC information associated with the retrieved data from the dual-ported memory device.

10. In a computer system having a host computer, a storage subsystem and a plurality of storage devices, a method of pipelined system operation for transferring data between the host computer and the plurality of storage devices through the storage subsystem, the method comprising the steps of:

providing a dual-ported memory device in the storage subsystem;

providing a RAID engine in the storage subsystem;

storing a first block of data from the host computer in the dual-ported memory device, wherein the host computer is coupled to a first port of the dual-ported memory device;

retrieving the first block of data from the dual-ported memory device to the RAID engine, wherein the RAID engine is coupled to a second port of the dual-ported memory device;

processing the first block of data in the RAID engine;

storing a second block of data from the host computer to the dual-ported memory device at the same time the RAID engine is processing the first block of data;

storing processed information associated with the first block of data from the RAID engine to the dual-ported memory device; and storing the first block of data and the associated processed information from the dual-ported memory device to the plurality of storage devices, wherein the plurality of storage devices are coupled to the first port of the dual-ported memory device.

11. The method of claim 10 wherein the step of providing a dual-ported memory device in the storage subsystem further comprises the step of providing a video random access memory (VRAM) device.

12. The method of claim 10 wherein the step of processing the first block of data in the RAID engine further comprises the step of calculating parity information associated with the first block of data in the RAID engine.

* * * * *